United States Patent Office
3,094,343
Patented June 18, 1963

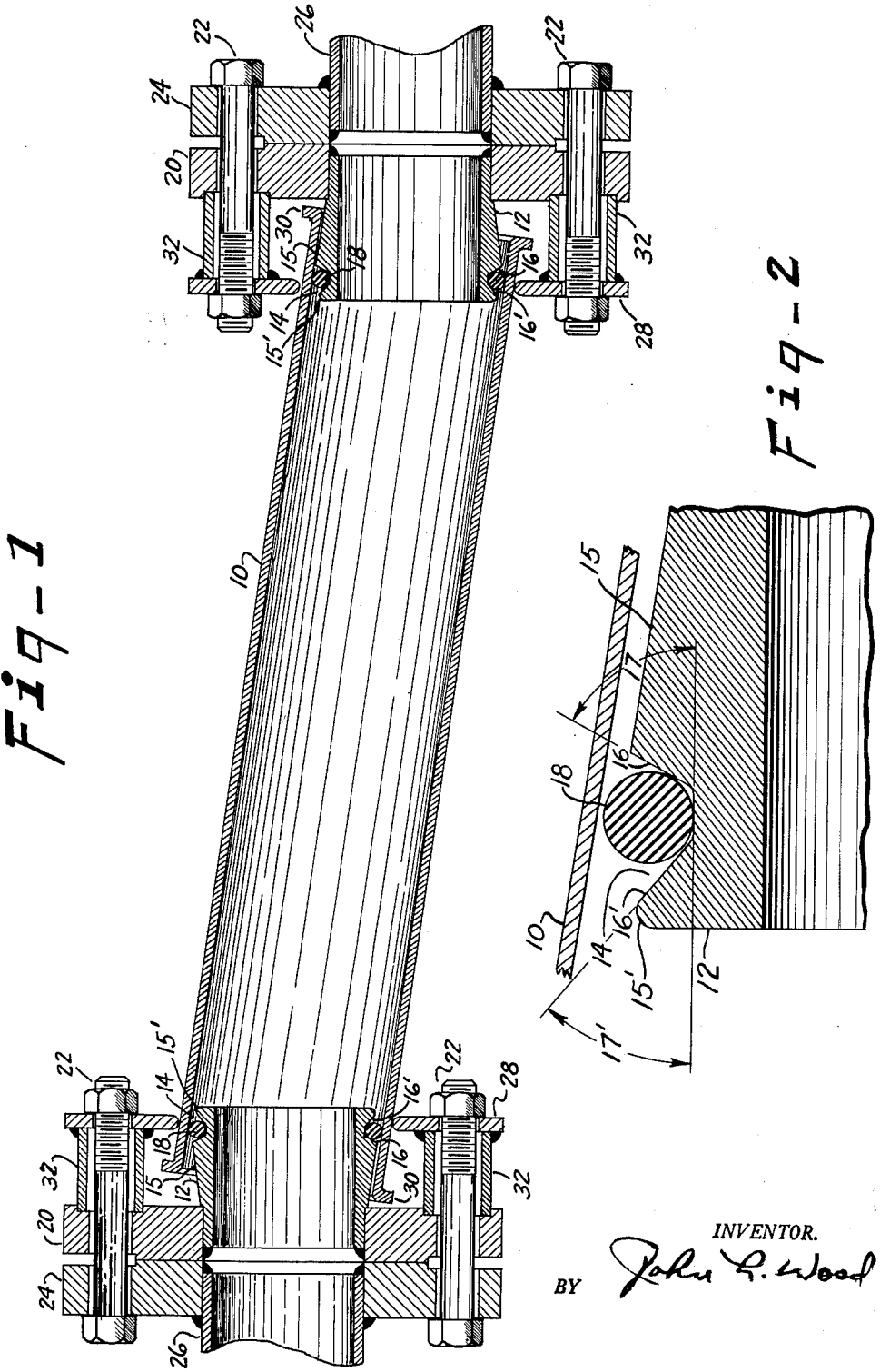

3,094,343
PIPE COUPLING
John L. Wood, Charleston Heights, S.C., assignor to West Virginia Pulp and Paper Company, New York, N.Y., a corporation of Delaware
Filed Mar. 13, 1959, Ser. No. 799,299
9 Claims. (Cl. 285—113)

This invention relates to pipe couplings for providing a fluid-tight connection to a pipe and more particularly this invention relates to pipe couplings for providing a fluid-tight connection to spaced sections of a pipe line which are axially or rotatively movable in relation to one another or are axially misaligned or where a combination of these conditions exist.

It is the object of this invention to provide a pipe coupling which will connect spaced sections of a pipe line containing a fluid at a substantially higher or lower pressure than the fluid medium surrounding such pipe line and which will effectively prevent the loss of fluid from or the entrance of external fluid medium into the pipe line under conditions where the sections of the pipe line to be connected have axial or rotative movement in relation to one another or are axially misaligned or where a combination of these conditions exist. This objective is obtained in the pipe coupling of this invention by the employment of a free moving sealing ring interposed between a groove formed circumferentially about a nipple connected to a section of pipe and a sleeve enclosing this nipple. As a result of the pressure differential which exists across the interspace between the nipple and the sleeve when the fluid contained within the pipe line is at a substantially different pressure than the surrounding medium, unbalanced forces are exerted on the sealing ring. These unbalanced forces cause the free moving sealing ring to be positioned in sealing relationship with the walls of the groove and the internal surface of the sleeve. In pipe couplings employing packing rings such as disclosed in U.S. 2,516,743, which depend upon mechanical compressive forces between the wall of the sleeve and the base of the groove acting on the packing ring to provide a seal, the unbalanced forces on the packing ring caused by pressure differential act transversely to the seal producing compressive forces and tend to destroy the seal. The pipe coupling of this invention does not depend upon mechanically induced compressive forces, in fact, it is important that no mechanically induced compressive forces be present. Also, the unbalanced pressure differential forces acting on the pipe coupling of this invention do not tend to destroy the seal but conversely are the agent whereby the seal is formed and maintained despite movement or misalignment of the pipe sections.

A more complete understanding of this invention will be had by referring to the drawings wherein:

FIG. 1 is a longitudinal section taken at the axis of a pipe coupling which embodies the preferred features of this invention and which will provide a fluid tight connection between axially misaligned and axially and rotatively movable sections of pipe.

FIG. 2 is an enlarged detail sectional view of the sealing means, as shown in the upper right hand corner, of the pipe coupling of FIG. 1.

The following description of the pipe coupling of this invention will be limited to only the connection with the pipe section shown on the right hand side of FIG. 1. Since the connecting structure at either end of the pipe coupling in FIG. 1 is identical it will be understood that the description is equally applicable to the connection with the pipe section shown in the left hand side of FIG. 1.

Referring to the drawings, sleeve 10 of circular cross section is fitted loosely around nipple 12, also of circular cross section, having a groove 14 circumferentially formed therein. Sleeve 10 having a greater inside diameter than the maximum outside diameter of nipple 12 extends over groove 14 completely enclosing the groove. The exterior surfaces 15, 15' of nipple 12 on either side of groove 14 are each tapered away from the groove toward each end of the nipple thus permitting the axial misalignment of sleeve 10 and nipple 12 as shown in FIG. 1. Groove 14 is formed in nipple 12 with walls 16, 16' sloping outwardly and forming acute angles 17, 17' with the axis of groove 14. (In FIG. 2 the axis of the groove has been transposed parallel to itself to a point at the base of the groove for ease of illustrating angles 17, 17'.) Positioned within groove 14 is sealing ring 18 which projects out of groove 14 and which has a greater cross sectional depth than the maximum clearance between sleeve 10 and the outer edges of groove 14 where walls 16, 16' intersect exterior surfaces 15, 15'. Since it is necessary according to this invention that sealing ring 18 be free to move axially within groove 14, it must have no mechanically induced compressive forces exerted upon it. To accomplish this, the maximum diameter of sealing ring 18 can only be as great as the inside diameter of sleeve 10 where sleeve 10 and nipple 12 are fitted together. It is also necessary in order to insure that no mechanical compression forces are induced on sealing ring 18 that the cross sectional width of groove 14 be at least as great as the cross sectional width of sealing ring 18 and that the inside diameter of the sealing ring be at least as large as the diameter of the base of the groove.

In operation when a pressure fluid is contained within the pipe line the resulting pressure differential forces act on sealing ring 18 urging it toward wall 16. Since sealing ring 18 is free to move, there being no mechanically induced compressive forces holding it in place, sealing ring 18 is first urged into contact with wall 16 and then along the sloping surface of wall 16 until contact is made with the interior of sleeve 10. In this position, i.e. the sealing ring is in joint contact with wall 16 and the inside of sleeve 10, an effective seal against the loss of pressure fluid from the pipe line is obtained.

When a fluid under vacuum is contained within the pipe line a similar action will occur except that sealing ring 18 will be urged into contact and along wall 16'. In either case the seal will be maintained during axial movement, axial misalignment and/or rotation of the nipple with respect to the sleeve since the seal producing agent, i.e. the pressure differential force, is entirely independent of any movement of the nipple or the sleeve. Due to this independence of the seal producing agent and movement of the nipple and sleeve, the pipe coupling as shown in the drawings has been found to be very effective even where the movement of the nipple with respect to the sleeve occurs in a very rapid alternating manner such as is caused by vibration as well as when the movements are at a very much slower rate such as results from expansion and contraction due to temperature changes. It should be noted that this freedom of movement between nipple 12 and sleeve 10 will permit the same freedom of movement between the nipples 12 at each end of the pipe coupling.

In order to provide a pipe coupling which is capable of easy installation and removal and which will not become disengaged during use, nipple 12 is integrally fastened to flange 20 which is removably fastened by bolts 22 to flange 24 on pipe section 26 and to end plate 28, separated from flange 20 by collars 32, having an opening slightly larger than sleeve 10 but of small enough diameter to engage the flanged end 30 of sleeve 10. By this arrangement the axial motion of sleeve 10 is limited to the distance between flange 20 and end plate 28 and consequently cannot slip off nipple 12.

While the pipe coupling shown in the drawings and described above is capable of connecting spaced sections of a pipe line containing either a fluid at a higher or lower pressure than the surrounding medium it is obvious that only one of the walls 16, 16' need be inclined where the coupling is intended to be used in an application where the pipe line is to contain a fluid only under pressure or only under vacuum.

It should be noted in this connection that where only one outwardly sloping wall 16 or 16' is provided in each of the two nipples that the sloping walls in the two nipples will slope in opposite directions to one another. That is, walls 16 which would be used when the pipe line contains a pressure fluid both slope away from each other toward the ends of the pipe coupling while walls 16' which would be used when the pipe line contains a fluid under vacuum both slope toward each other toward the center of the pipe coupling.

The angles 17, 17' which walls 16, 16' form with the axis of the grooves 14 are somewhat dependent on the pressure differentials which can be expected to exist. At very low differential pressures a very small angle should be used to enable the small amount of differential force to move the sealing ring along the inclined wall into a sealing position. For example, a wall angle of 15° has been found to be very effective where a pressure differential of approximately 5 p.s.i. existed and a sealing ring composed of tetrafluoroethylene plastic was used. As the pressure differential increases, the angle of the wall with the axis of the groove should also increase to prevent the deformation or perhaps even complete loss of the sealing ring due to the tendency of the pressure differential forces to extrude the sealing ring. With a 350 p.s.i. pressure differential and a tetrafluoroethylene plastic sealing ring, an angle of 45° has been found to provide very satisfactory service. The exact angle of the wall, however, is not at all critical and wide ranges of pressure differentials can be accommodated by any given angle. Consideration, however should also be given to the consistency of the sealing ring in the design of wall angle. In general, the use of materials somewhat more deformable than tetrafluoroethylene plastic will necessitate the employment of slightly greater wall angles. Dependent on the pressure differential and the composition of the sealing ring a wall forming any acute angle may be used, but generally wall angles between approximately 15 and 60° will be satisfactory in most cases.

It should also be realized that while the pipe coupling in the drawings and as described above will permit axial misalignment, and relative axial movement and rotative movement of the pipe sections being connected, modifications can readily be made which may limit one or more of these conditions without departing from the concept of this invention. Thus where axial misalignment is not involved or is very small, nipples 12 need not be provided with tapering external surfaces but may be cylindrical. Also, unless relative rotative movement is desired, it is not necessary to use a sleeve 10 and nipple 12 of circular cross section but these may be of oval, rounded, square, or other shape. Where rapidly alternating axial misalignment is involved, however, it is not recommended that these non circular shapes be utilized as some binding of the sealing ring may occur thus preventing proper sealing of the coupling.

It is obvious that the clearance between sleeve 10 and the outer edges of groove 14 should not exceed the cross sectional depth of sealing ring 18. In general best results will be had by limiting this clearance to less than one half the cross sectional depth of sealing ring 18. Not only will this tend to prevent the extrusion of the sealing ring but it will also eliminate the possibility of the sealing ring becoming pinched between the outer edges of the groove and the sleeve.

Sealing ring 18, when not subjected to pressure differential forces, is preferably of a slightly smaller outside diameter than the inside diameter of sleeve 10, rather than of equal diameter, in order to insure that the sealing ring during the build up of pressure differential forces does not bind and thereby lose its ability to move freely. This is particularly true where the sealing ring is subject to expansion due to temperature increases. Since the pressure differential forces acting on the sealing ring 18 must cause the sealing ring 18 to move along the sloped surface of walls 16 or 16' until contact is made with the inner surface of sleeve 10, a slight expansion of the sealing ring must occur. It is therefore necessary that the difference in the outside diameter of the sealing ring 18 and the inside surface of sleeve 10 be small enough that the differential forces will be able to expand the sealing ring sufficiently to provide the seal. The amount of difference will be dependent on the diameter of the sleeve and sealing ring, on the pressure differential on the composition of the sealing ring, and on possible temperature changes.

While it will be generally easier to fabricate groove 14 with walls 16, 16' in the shape of conical section, i.e. where the axial cross section of the wall is a straight line, walls 16, 16' can obviously be made having uniform cross sections in the shape of any smooth curve without departing from this invention. When curved surfaces are used the tangents of the surface at the points at which sealing ring 18 will come into contact should slope outwardly forming acute angles with the axis of the groove.

Of great importance in providing a pipe coupling which will operate satisfactorily is the choice of material for the sealing ring. The material to be used will vary greatly dependent on pressure differential, wall angle, temperatures involved, and corrosiveness of the fluid contained in the pipe line. For use under the rather severe conditions encountered with high pressure steam lines tetrafluoroethylene plastic has been found to be particularly useful as sealing rings because of its ability to withstand high temperatures and the corrosive action of the steam and to maintain its ability to conform to the sealing surfaces and to expand slightly while remaining essentially non deformable.

Other materials, however, are also well suited for employment in the fabrication of the sealing ring in many applications. Some of these materials are, polyethylene, nylon, other plastics and soft metals such as copper. However, it must be kept in mind that under certain conditions some materials will not be usable, for example, thermoplastic materials can not be used where high temperatures are involved. All materials which are to be employed should, however, be comformable to the sealing surfaces, expandable and resistant to substantial deformation under the conditions of operation. By this it is meant that the material should be soft and flexible enough to yield slightly to conform to slight irregularities in the sealing surfaces of the walls and sleeve but should not be so soft and flexible that the sealing ring will become appreciably deformed during operation or will stick to the surfaces with which it comes in contact.

It is obvious that many changes and modifications can be made in the above described details without departing from the spirit of this invention and it is to be understood that the invention should not be limited to said details except as set forth in the appended claims.

I claim:

1. A flexible pipe coupling comprising a nipple having an external circumferential groove with at least one wall thereof sloping outwardly, a sleeve having a smooth inner surface of substantially the same cross sectional complemental shape as the exterior surface of the nipple, means for connecting said nipple to said sleeve whereby said sleeve encircles the nipple and is freely movable in axial relationship thereto, and a sealing ring positioned within and projecting radially out of the groove, the sealing ring having an outside radial dimension no greater than the inside radial dimension of the sleeve where the sleeve encircles the groove and otherwise so constructed that the sealing ring is mechanically uncompressed between any of the surfaces of the groove and the sleeve and able to move freely within the confines of the groove when no pressure differential exists between the interior and exterior of the coupling and is able to be positioned into a sealing relationship between the sloping wall of the groove and the interior surface of the sleeve solely by fluid forces created by a pressure differential between the interior and exterior of the coupling; said sealing ring being constructed of a material which is conformable to the smooth interior surface of the sleeve and to the surface of the sloping wall, expandable, and resistant to substantial deformation when acted on by fluid forces created by a pressure differential existing between the interior and exterior of the coupling.

2. The pipe coupling of claim 1 wherein the inner surface of the sleeve and the exterior surface of the nipple are circular in cross section and the nipple and the sleeve are freely rotatable in relation to one another.

3. The pipe coupling of claim 1 wherein the exterior surface of the nipple is tapered inwardly from the groove toward each end of the nipple.

4. The pipe coupling of claim 1 wherein the outwardly sloping wall of the groove forms an angle between 15 and 60 degrees with the axis of the groove.

5. The pipe coupling of claim 1 wherein the sealing ring has an outside radial dimension less than the inside radial dimension of the sleeve.

6. The pipe coupling of claim 1 wherein the sealing ring is composed of tetrafluoroethylene plastic.

7. The pipe coupling of claim 1 wherein the groove has two outwardly sloping walls.

8. The pipe coupling of claim 1 which includes a pipe axially aligned with the nipple, an end plate having an opening there through transversely encircling the sleeve with an all around clearance, a flange connected to the nipple, means for spacing the end plate a substantial distance from said flange connected to the nipple, means for detachably connecting together the end plate and said flange, and a flange at the end of the sleeve having a substantially greater diameter than the diameter of the opening in the end plate.

9. The pipe coupling of claim 1 wherein the other end of the sleeve is fitted around a second sealing ring and second nipple having a groove with an outwardly sloping wall that slopes in the opposite direction to the slope of the outwardly sloping wall of the groove in the first nipple.

References Cited in the file of this patent

UNITED STATES PATENTS

| | | |
|---|---|---|
| 336,199 | Bannister | Feb. 16, 1886 |
| 365,387 | Klein | June 28, 1887 |
| 797,796 | Devlin | Aug. 22, 1905 |
| 1,861,755 | Rasmussen | June 7, 1932 |
| 2,516,743 | Allin | July 25, 1950 |
| 2,731,185 | Ranney | Jan. 17, 1956 |
| 2,760,794 | Hartranft | Aug. 28, 1956 |
| 2,841,419 | Jay | July 1, 1958 |

FOREIGN PATENTS

| | | |
|---|---|---|
| 115,326 | Australia | June 10, 1942 |